(12) United States Patent
Grosse et al.

(10) Patent No.: US 9,052,178 B2
(45) Date of Patent: Jun. 9, 2015

(54) CONTACTLESS DISTANCE MEASURING SENSOR AND METHOD FOR CONTACTLESS DISTANCE MEASUREMENT

(71) Applicants: Burkert Werke GmbH, Ingelfingen (DE); Micro-Epsilon Messtechnik GmbH & Co. KG, Ortenburg (DE)

(72) Inventors: Kersten Grosse, Radebeul (DE); Werner Grommer, Ortenburg (DE)

(73) Assignees: Burkert Werke GmbH, Ingelfingen (DE); Micro-Epsilon Messtechnik GmbH & Co., KG, Ortenberg (DE)

( * ) Notice: Subject to any disclaimer, the term of this patent is extended or adjusted under 35 U.S.C. 154(b) by 254 days.

(21) Appl. No.: 13/645,661

(22) Filed: Oct. 5, 2012

(65) Prior Publication Data

US 2013/0088217 A1   Apr. 11, 2013

(30) Foreign Application Priority Data

Oct. 7, 2011   (DE) .......................... 10 2011 115 030

(51) Int. Cl.
*G01B 7/14* (2006.01)
*G01B 7/00* (2006.01)

(52) U.S. Cl.
CPC ..................................... *G01B 7/003* (2013.01)

(58) Field of Classification Search
CPC ....... G01B 7/003; G01D 5/2216; G01D 5/22; G01D 5/2291
USPC .............. 324/207.17, 207.18, 207.12, 207.22
See application file for complete search history.

(56) References Cited

U.S. PATENT DOCUMENTS 5,432,493 A   7/1995   Pitt
6,580,264 B2   6/2003   Nekado

FOREIGN PATENT DOCUMENTS

| CN | 85100150 A | 7/1986 |
| DE | 4033252 A1 | 4/1992 |
| DE | 10338265 B3 | 4/2005 |
| DE | 102009049063 A1 | 4/2011 |
| EP | 0340317 A1 | 4/1988 |
| JP | 20009412 A | 1/2000 |
| JP | 2002139301 A | 5/2002 |

OTHER PUBLICATIONS

German Search Report received Sep. 28, 2012, 10 2011 115030.0.

*Primary Examiner* — Reena Aurora
(74) *Attorney, Agent, or Firm* — Carlson, Gaskey & Olds, PC

(57) ABSTRACT

A noncontact distance measuring sensor and a method for noncontact distance measurement is provided. The distance measuring sensor has a coil arrangement including at least two measuring coils oriented along a common axis. An electrically and/or magnetically conducting measurement object is in electromagnetic interaction with the coil arrangement. The distance measuring sensor further has an evaluation circuit for evaluating and ascertaining a position of the measurement object. In addition to the measuring coils, the noncontact distance measuring sensor includes an additional coil which is arranged along the common axis, is coupled to the evaluation circuit, and at least partly overlaps at least one of the two measuring coils.

13 Claims, 4 Drawing Sheets

CONTACTLESS DISTANCE MEASURING SENSOR AND METHOD FOR CONTACTLESS DISTANCE MEASUREMENT

CROSS-REFERENCE TO RELATED APPLICATION

This application claims priority to DE 10 2011 115 030.0, filed Oct. 7, 2011.

TECHNICAL FIELD

The present invention relates to a noncontact distance measuring sensor, including at least two measuring coils oriented along a common axis, an electrically and/or magnetically conducting measurement object which is in an electromagnetic interaction with the coil arrangement, and an additional coil which is arranged on the common axis and at least partly overlaps at least one of the two measuring coils. The present invention further relates to a method for noncontact distance measurement.

BACKGROUND OF THE INVENTION

Noncontact distance measuring sensors known from the prior art which operate on the principle of a variable differential inductor or on the principle of a linear variable differential transformer (LVDT), for example, feature the design-related technical problem that even in the event that the measurement object is situated outside the measuring range, a measuring signal can appear which cannot be distinguished from a valid measuring signal. In a distance measuring sensor or displacement pickup operating on the principle of a variable differential inductor, two coils are connected in series and cooperate jointly with a typically ferromagnetic core as the measurement object in the nature of a Wheatstone half bridge. When the ferromagnetic measuring body, which may be a solenoid plunger arranged in the interior of the coils for example, is situated exactly in the center position between the two measuring coils, the bridge circuit is balanced and the measuring voltage is identically zero. When the core is moved out of this initial position, the impedances of the two measuring coils will change in opposite directions and the measuring voltage will increase within the valid measuring range, ideally proportionally to the displacement of the measurement object. Based on the signal tapped at such a displacement sensor, however, the case in which the core is situated exactly in its initial position, i.e. between the two measuring coils, cannot be distinguished from that case in which the core was removed from the valid measuring range, for example due to a defect of the displacement sensor. For this reason, expensive precautionary measures need to be taken in displacement sensors known from the prior art in order to rule out that the measurement object leaves the valid measuring range.

Similar technical challenges emerge in the case of displacement sensors that operate on the principle of a linear variable differential transformer. Displacement sensors of this type include a primary coil and two secondary coils which are coupled according to the principle of a transformer with a ferromagnetic core which may also be a solenoid plunger. The primary coil, which is situated between the two secondary coils as viewed along a common direction of longitudinal extent of the three coils mentioned, is supplied with an alternating voltage. The core causes a coupling between the primary coil and the two secondary coils. A secondary-side voltage is induced in the two secondary coils that are adjacent to the primary coil, the secondary-side voltage being identically zero in the center position of the core because of the coupling of the two secondary coils in opposite directions. When the core is displaced from this initial position, the measuring voltage will change as a function of the distance covered by the core. This means that also with the displacement pickup operating on the principle of a linear variable differential transformer, it is not possible to distinguish, solely on the basis of the signal provided by such a distance measuring sensor, between that case in which the core is exactly positioned in its initial position between the two secondary coils and that case in which the core has been removed from the coil arrangement. It is therefore required to take respective precautionary measures in such a distance measuring sensor as well, in order to rule out that the measurement object leaves the valid measuring range.

This behavior of the above-mentioned displacement sensors may in some circumstances lead to misinterpretations of the measuring signals provided by these sensors. In addition, the precautionary measures taken to ensure that the measurement object does not leave the valid measuring range involve an additional design engineering expenditure.

SUMMARY OF THE INVENTION

An improved noncontact distance measuring sensor and an improved method for noncontact distance measurement are provided, in which it is more particularly possible to determine whether the measurement object of the distance measuring sensor is situated within a valid measuring range.

The noncontact distance measuring sensor, according to one example, includes a coil arrangement having at least two measuring coils oriented along a common axis. This distance measuring sensor further includes an electrically and/or magnetically conducting measurement object which is in an electromagnetic interaction with the coil arrangement. An evaluation circuit for evaluating and ascertaining a position of the measurement object is coupled to a voltage tap of the coil arrangement. A signal that indicates a position of the measurement object in relation to an initial position of the measurement object can be detected at this voltage tap. The evaluation circuit is designed to convert this signal to an output quantity that indicates the position of the measurement object in relation to the initial position thereof. In addition, the noncontact distance measuring sensor includes an additional coil which is arranged on the common axis, is coupled to the evaluation circuit, and is arranged to at least partly overlap at least one of the two measuring coils.

In the noncontact distance measuring sensor, advantageously a further signal, namely the signal of the additional coil, is available to the evaluation circuit. The evaluation of this further signal allows an assessment as to whether or not the measurement object is situated in a valid measuring range of the distance measuring sensor. As a result, the noncontact distance measuring sensor according to aspects of the invention is, for one thing, more reliable than distance measuring sensors known from the prior art and, for another thing, mechanically simpler to design.

According to one example embodiment, the coil system of the distance measuring sensor is structured symmetrically in relation to the initial position of the measurement object when the coil system is viewed along the common axis. In contrast thereto, the additional coil, likewise viewed along the common axis, is arranged asymmetrically in relation to the initial position of the measurement object.

In other words, the coil system is structured mirror-symmetrically to a plane that is oriented perpendicularly to the common axis. The mirror plane intersects the common axis at the rest position or initial position of the measurement object. If, according to further aspects of the invention, the distance measuring sensor is structured according to the principle of a variable differential inductor or a linear variable differential transformer, in the simplest case this rest or initial position is defined in that in the event that the measurement object is in this initial position, the two measuring coils of the coil system are balanced and no signal can be measured at the voltage tap.

For design-related reasons, distance measuring sensors known from the prior art which have symmetrically structured coil systems provide the same signal for the case when the measurement object is in its initial position in the center of the measuring range and for the case in which no measurement object is present in the coil system. An asymmetrical arrangement of the additional coil which, as already mentioned, makes a further signal available, obviates this design-related drawback.

According to one example embodiment, the distance measuring sensor or the coil arrangement thereof includes an open end at which the measurement object can leave a measuring range of the distance measuring sensor. According to this embodiment, the additional coil, viewed along the common axis, is arranged between the initial position of the measurement object and the open end of the distance measuring sensor. The additional coil preferably extends in a region that is adjacent to the initial position of the measurement object in the direction of the common axis. An additional signal can be generated with the aid of the additional coil. Advantageously, by an evaluation of this additional signal it can be determined whether the measurement object is still positioned within the valid measuring range or whether it has left this range.

According to a further example embodiment, the measurement object may be arranged within the coil arrangement. In other words, the measurement object is arranged within an interior enclosed by the coil system. This embodiment allows a compact type of construction of the distance measuring sensor. But it is also possible for the additional coil to enclose the coil arrangement. This positioning of the additional coil allows a simple integration of the additional coil in coil arrangements of existing distance measuring sensors. Advantageously, in such an arrangement only minor adjustments are required in the production of the distance measuring sensor.

Preferably, the measuring coils and the additional coil are long coils, e.g. oblong cylindrical coils. It is furthermore of advantage if the coil arrangement is encapsulated in a housing. A distance measuring sensor according to such an exemplary embodiment features not only a compact structural shape, but also a high ruggedness.

According to a further example embodiment, the additional coil is coupled to be operated in an idle state. Such a coupling of the additional coil may be realized, for example, using an instrumental amplifier having a high input resistance. The immediate vicinity between the measuring coils and the additional coil results in a basically undesirable mutual influence. The additional coil can be operated in an idle state to prevent a one-sided load on the measuring coil or coils.

A further advantageous noncontact distance measuring sensor includes a coil arrangement having series-connected first and second measuring coils. The voltage tap is located between the two measuring coils, as viewed along the common axis. The voltage tap is located at least approximately at the initial position of the measurement object. In the distance measuring sensor according to the exemplary embodiment mentioned here, the first and second measuring coils cooperate with the measurement object in the nature of a half bridge. Advantageously, in this way a noncontact distance measuring sensor can be indicated which operates on the principle of a variable differential inductor.

According to a further exemplary embodiment, the number of the components necessary in a distance measuring sensor may be further reduced by coupling the additional coil to the voltage tap. As a consequence, the sum of the signal of a measuring signal, plus the signal generated by the additional coil, is applied at a tap of the additional coil. This sum signal is tapped preferably using an operational amplifier and, further preferably, is subsequently digitally sampled. The further processing of the signal may likewise be performed digitally.

A further advantageous distance measuring sensor comprises a coil arrangement which includes first to third coils. The first and third coils act as measuring coils. The second coil, which is arranged between the first and third coils in the direction of the common axis, is preferably energized by an alternating voltage. The first and third coils are coupled in opposite directions so that the coil arrangement cooperates with the measurement object in the nature of a linear variable differential transformer, with the first and third coils acting as the secondary coil and the second coil acting as the primary coil of this linear variable differential transformer. In the distance measuring sensor according to the present embodiment, the voltage tap is effected differentially, i.e. between the free ends of the coupled first and third coils. Advantageously, a distance measuring sensor can be indicated that operates on the principle of a linear variable differential transformer.

In comparison to a distance measuring sensor operating on the principle of a variable differential inductor, in the distance measuring sensor according to the exemplary embodiment mentioned here, which operates on the principle of a linear variable differential transformer, two voltage taps are used, rather than one voltage tap.

According to a further example embodiment, the evaluation circuit of the noncontact distance measuring sensor is designed to determine, on the basis of a signal detectable at the additional coil, whether the signal detected at the voltage tap is valid or invalid. This is preferably performed using an evaluation circuit which is designed to first calculate a limit value from the output quantity indicating the position of the measurement object in relation to its initial position. Depending on whether the signal detectable at the additional coil exceeds or falls below this limit value, the evaluation circuit specifies whether the signal detected at the measuring coils is valid or invalid.

In accordance with a further aspect of the invention, a method for noncontact distance measurement is provided. In this method, the position of an electrically and/or magnetically conducting measurement object in relation to a coil arrangement including at least two measuring coils oriented along a common axis is determined by detecting at the voltage tap a measuring signal indicating a position of the measurement object in relation to the initial position thereof. In addition, a signal is detected at an additional coil which at least partly overlaps at least one of the two measuring coils. In this manner it is possible to determine whether the signal detected at the voltage tap is valid or invalid.

Preferably, according to a further embodiment of such method, the measuring signal is first detected at the voltage tap. A limit value can be calculated from this measuring signal. On the basis of a comparison between the limit value and the signal detected at the additional coil, it can be determined whether the signal detectable at the voltage tap is valid or invalid.

The same or similar advantages as have already been mentioned with respect to the noncontact distance measuring sensor also apply to the method for noncontact distance measurement and therefore need not be further explained.

BRIEF DESCRIPTION OF THE DRAWINGS

The invention will now be explained in more detail on the basis of various exemplary embodiments and with reference to the drawings, in which.

DESCRIPTION

Figure 1:
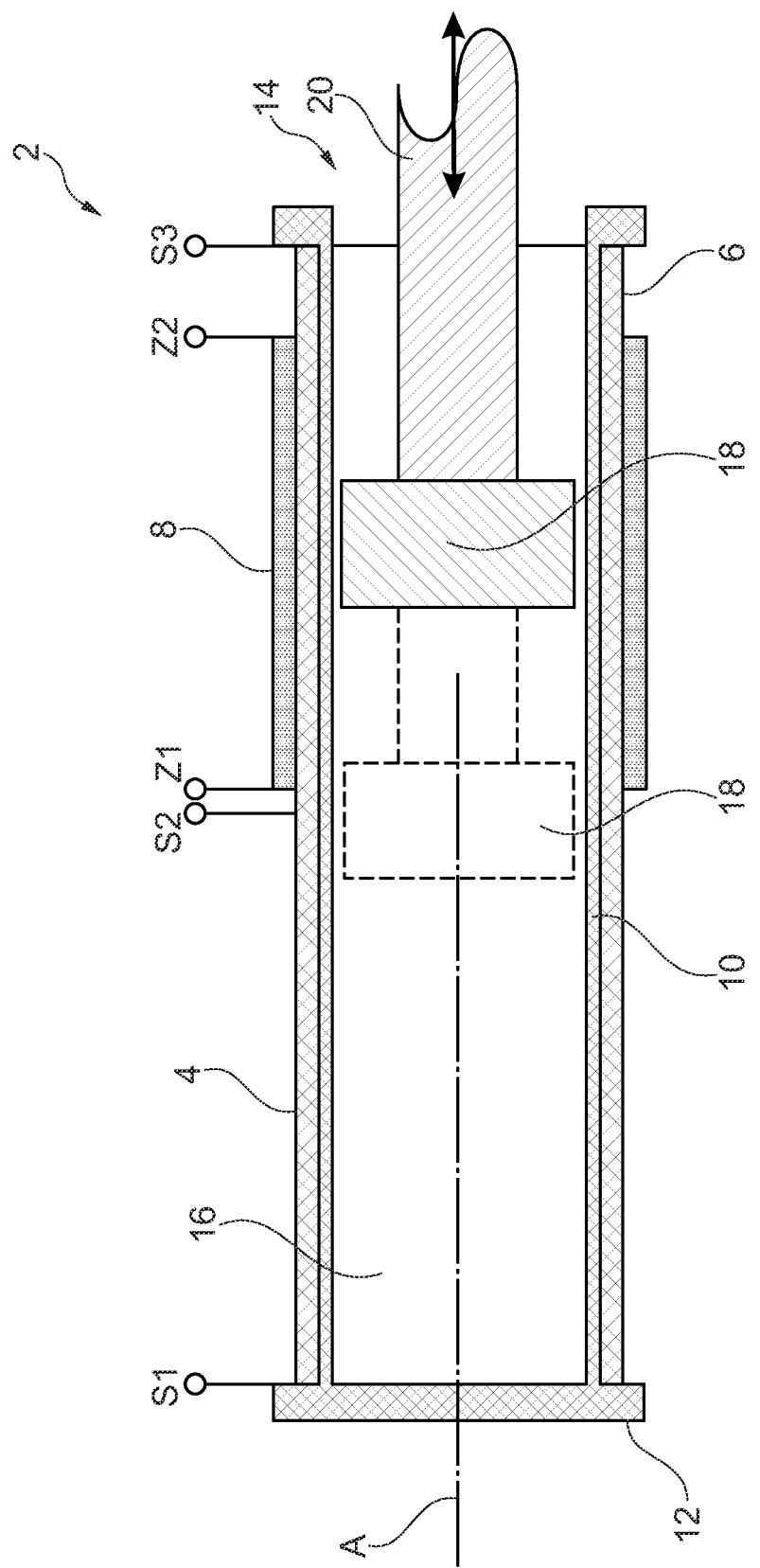
FIG. 1 shows a simplified cross-sectional view of a noncontact distance measuring sensor according to a first exemplary embodiment.

FIG. 1 is a simplified cross-sectional view of a distance measuring sensor 2 which includes a first measuring coil 4, a second measuring coil 6, and an additional coil 8. The coils 4, 6, 8 are held mechanically by a coil body 10 which has an end closed by a cover 12, for example, and an open end 14. The coil body 10 is preferably cylinder-shaped. Accordingly, the first and second measuring coils 4, 6 and the additional coil 8 preferably are cylindrical long coils. The first and second measuring coils 4, 6 and the additional coil 8 are oriented along a common axis A. Preferably, the axis A coincides with the respective axes of the individual coils 4, 6, 8. Situated in an interior 16 of the coil arrangement comprised of the first and second measuring coils 4, 6 is a measurement object 18, which preferably is electrically and/or magnetically conductive and establishes an interaction with the coil arrangement and with the additional coil 8. The measurement object 18 is held in the interior 16 with the aid of a holder 20. The holder 20 may be used for coupling the measurement object 18 to, e.g., a caliper (not shown in FIG. 1), for travel sensing. For design-related reasons, the measurement object 18 can leave the distance measuring sensor 2 only at the open end 14 of the coil body 10. According to an alternative exemplary embodiment, the measurement object 18 is not arranged in the interior 16 of the coil arrangement, but encompasses the outside of the coil system comprised of the first and second measuring coils 4, 6 and the additional coil 8. But the mode of operation of such a distance measuring sensor 2 corresponds to that of a distance measuring sensor 2 in which the measurement object 18 is situated within the interior 16, as is illustrated in FIG. 1. For this reason, merely by way of example reference is made below to a distance measuring sensor 2 in which the measurement object 18 is situated within an interior 16 enclosed by the coil system.

The distance measuring sensor 2 according to the exemplary embodiment illustrated in FIG. 1 operates on the principle of a variable differential inductor. To detect the position of the measurement object 18 that is displaceable along the axis A, first the coil arrangement comprised of the first and second measuring coils 4, 6 is energized at the terminals S1 and S3. The signal required for the displacement measurement is tapped at the terminal S2 that acts as a voltage tap. The voltage to be measured at the voltage tap S2 is dependent on the ratio of the inductances of the first and second measuring coils 4, 6. From an electrical point of view, the first and second measuring coils 4, 6, jointly with the measurement object 18, constitute a Wheatstone half bridge. When the measurement object 18 which, as an example, is embodied as a solenoid plunger, is in its initial position, shown in dashed lines in FIG. 1, the measurement object 18 causes the first and second measuring coils 4, 6 to have the same impedance and the bridge circuit to be balanced. When the measurement object 18 is moved out of its initial position (in the manner as illustrated in solid lines in FIG. 1), the impedances of the first and second measuring coils 4, 6 will change in opposite directions and the voltage to be measured at the voltage tap S2 will increase or decrease within a valid measuring range, preferably proportionally to the displacement of the measurement object 18.

In a distance measuring sensor which, unlike the distance measuring sensor 2 shown in FIG. 1, only has a first and a second measuring coil 4, 6 and no additional coil 8, the condition in which the measurement object 18 is in its initial position (in this case no signal is detectable at the voltage tap S2) cannot, for design-related reasons, be distinguished from that case in which the measurement object 18 has left the distance measuring sensor 2 or the coil body 10 at the open end 14 thereof. This design-related drawback is advantageously overcome in the distance measuring sensor 2 according to the exemplary embodiment illustrated in FIG. 1. This is effected by the use of an additional coil 8, whose signal can be tapped at the terminals Z1 and Z2. The additional coil 8 is mounted only in a small area of the coil system comprised of the measuring coils 4, 6. Viewed along the axis A and in relation to the initial position of the measurement object 18, the additional coil 8 is advantageously arranged non-symmetrically within the measuring range of the distance measuring sensor 2. The additional coil 8 starts roughly in the middle of the measuring range, close to the voltage tap S2, and extends toward the open end 14 of the coil body 10. Since the coil body 10 is closed by a cover 12 on the opposite side, the measurement object 18 cannot leave the coil body 10 on this side of the measuring range. It is therefore sufficient if one additional coil 8 is arranged in a region between the initial position of the measurement object 18 or the voltage tap S2 and the open end 14 of the coil body 10. An evaluation of the signal supplied at the terminals Z1 and Z2 of the additional coil 8 allows a unique recognition of the position of the measurement object 18 within the coil arrangement. In other words, the position signal detected at the voltage tap S2 can be verified with the aid of the signal tapped at the additional coil 8.

Basically, the measuring coils 4, 6 and the additional coil 8 may be operated as separate active sensors. Their immediate spatial vicinity, however, results in an undesirable mutual influence. For this reason, the additional coil 8 is advantageously operated as a secondary coil of a transformer with the windings of the first and second measuring coils 4, 6 as the primary coil. To avoid a one-sided load on the windings of the first and second measuring coils 4, 6, the additional coil 8 is advantageously operated in an idle state, i.e. an evaluation of the signals tapped at the terminals Z1 and Z2 is performed by an instrumental amplifier having a high input resistance.

The first and second measuring coils 4, 6 are energized with the aid of a suitable evaluation circuit. This evaluation circuit also serves to process the signals tapped at the voltage tap S2 and also at the terminals Z1 and Z2 of the additional coil 8. Before such an evaluation circuit is to be described in detail, a further distance measuring sensor 2 in accordance with a further exemplary embodiment as illustrated in a simplified cross-sectional view in FIG. 2 will be discussed.

Figure 2:
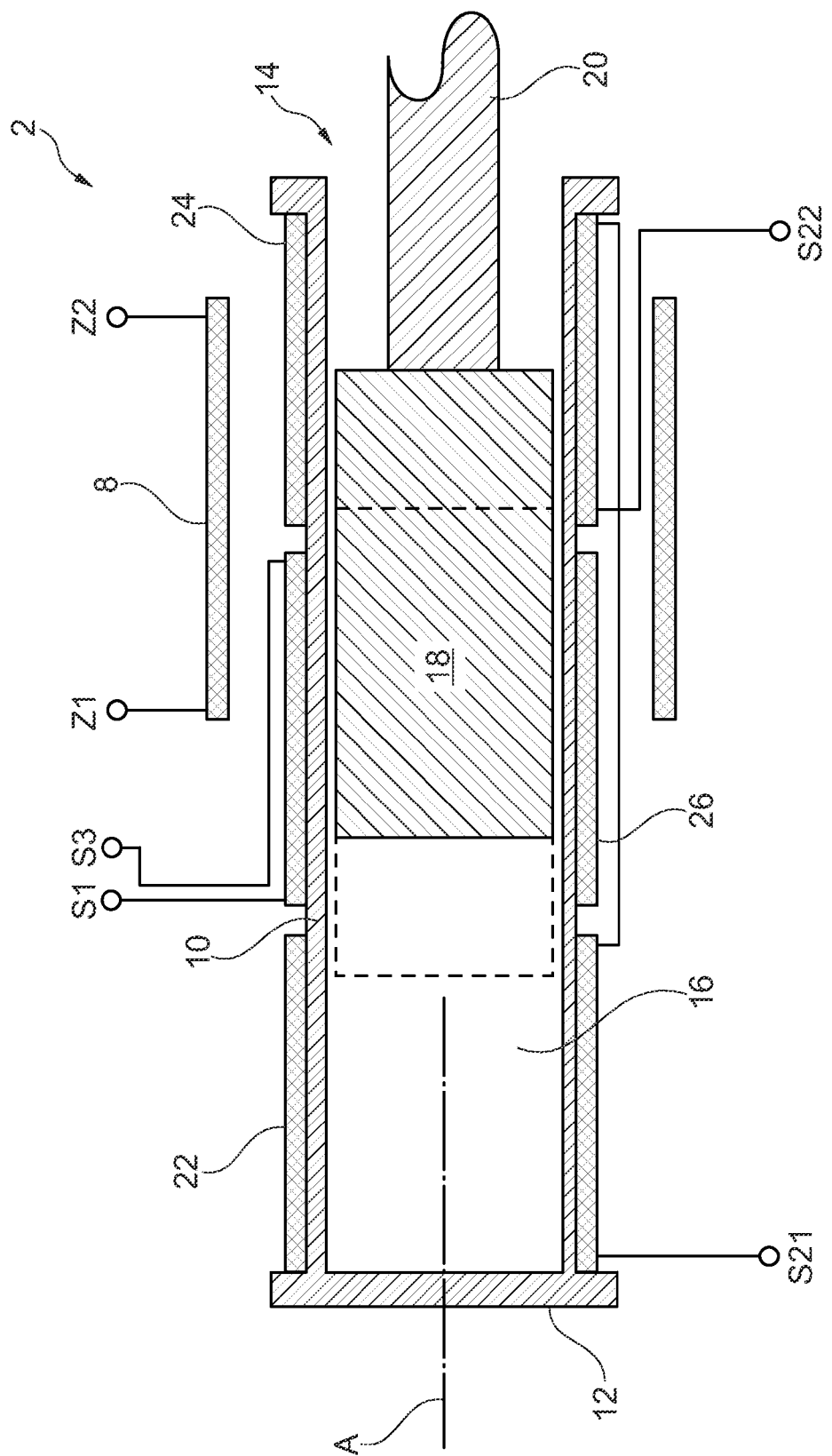
FIG. 2 shows another simplified cross-sectional view of a noncontact distance measuring sensor according to a further exemplary embodiment.

The distance measuring sensor 2 illustrated in FIG. 2 comprises a first coil 22 which is coupled to a third coil 24 in opposite directions. The first and third coils 22, 24 act as measuring coils. A second coil 26 is situated between the first and third coils 22, 24 as viewed along a common axis A. The first to third coils 22, 24, 26 are arranged on a shared coil body 10 and held by the same. Corresponding to the exemplary embodiment shown in FIG. 1, the coil body 10 is closed by a cover 12 on one side and has an open end 14 on its opposite side. The coil body 10 may preferably be cylinder-shaped again. Accordingly, the first to third coils 22, 24, 26 are preferably also elongated cylindrical coils.

In the distance measuring sensor 2 illustrated in FIG. 2, the measurement object 18 is again held within the interior 16 with the aid of a holder 20 and is thus in the form of a solenoid plunger. But according to a further exemplary embodiment, the measurement object 18 may not be arranged within the interior 16, but may enclose the coil system, which is comprised of the first to third coils 22, 24, 26 and the additional coil 8, on the outside thereof. In such an exemplary embodiment, the measurement object 18 is embodied as a ring which encloses the aforesaid coil system. The following explanations will be given merely by way of example with reference to a distance measuring sensor 2 in which the measurement object 18 is situated within the interior 16, as illustrated in FIG. 2. The mode of operation of a distance measuring sensor 2 in which the preferably annularly shaped measurement object 18 encloses the coil system on the outside thereof corresponds to the mode of operation explained in connection with FIG. 2.

The distance measuring sensor 2 shown in FIG. 2 operates on the principle of a linear variable differential transformer. In such a distance measuring sensor 2, also referred to as an LVDT sensor, the first and third coils 22, 24 are coupled by a preferably ferromagnetic measurement object 18 in accordance with the principle of a transformer, with the first and third coils 22, 24 acting as the secondary coils and the second coil 26 acting as the primary coil of such a transformer. Preferably, the second coil 26 is supplied with an alternating voltage via the terminals S1 and S3. In the initial position, illustrated in dashed lines in FIG. 2, of the measurement object 18, a voltage is induced in the first and third coils 22, 24 which is phase-shifted relative to the voltage supplied. Owing to the connection in opposite directions of the first and third coils 22, 24, which operate as measuring coils, the signal detectable at the voltage taps S21, S22 is identically zero when the measurement object 18 is in its center position. A change in the position of the measurement object 18, which may be in the form of a solenoid plunger, for example, will result in a change in the voltage detectable at the voltage taps S21, S22, preferably proportional to the distance traveled by the measurement object 18.

In the distance measuring sensor 2 shown in FIG. 2, the signal detectable at the voltage taps S21, S22 is also identically zero when the measurement object 18 is in its center position, and can therefore not be distinguished from the case in which the measurement object 18 has left the coil arrangement, i.e. the coil body 10, at the open end 14 thereof. To allow these two cases to be distinguished, the distance measuring sensor 2 illustrated in FIG. 2 includes an additional coil 8. Viewed in comparison to the initial position of the measurement object 18, the additional coil 8 is arranged in a region of the coil arrangement that extends toward the open end 14 of the coil body 10. When the measurement object 18 is in a position outside its initial position and in such a region of the measuring range that adjoins the open end 14 of the coil body 10 (as is illustrated by way of example in solid lines in FIG. 2), a signal caused by the measurement object 18 is measured in the additional coil 8. Since the measurement object 18 cannot leave the coil body 10 at the opposite side of the coil body 10, it is possible to ascertain at all times, based on the signal tapped at the terminals Z1 and Z2 of the additional coil 8, whether the signal tapped at the voltage tap S21, S22 is valid or invalid.

The noncontact distance measuring sensors 2 illustrated by way of example in FIG. 1 and FIG. 2 furthermore comprise an evaluation circuit (not shown in the Figures) for evaluating the signals supplied and detected at the terminals and at the voltage tap, respectively.

Figure 3:
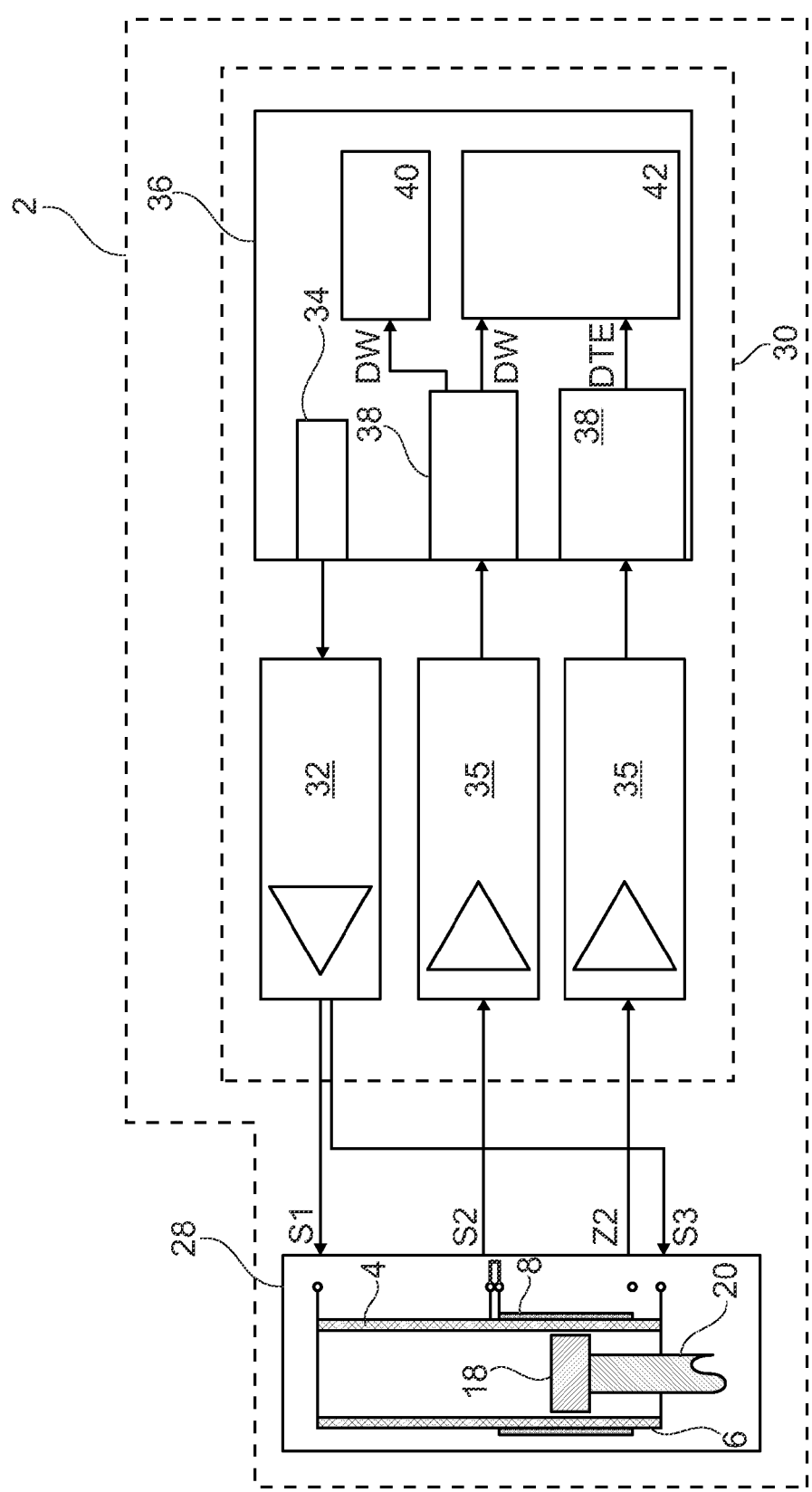
FIG. 3 shows a simplified circuit diagram of a noncontact distance measuring sensor with a connected evaluation circuit according to an exemplary embodiment.

FIG. 3 shows a noncontact distance measuring sensor 2 comprised of a displacement pickup 28 already known from FIG. 1 and an evaluation circuit 30 connected thereto. According to a preferred exemplary embodiment, the first terminal Z1 of the additional coil 8 and the voltage tap S2 are coupled. As a result, the sum of the measuring signal supplied at the voltage tap S2 and the signal induced in the additional coil 8 is supplied at the terminal Z2 of the additional coil 8.

The first and second measuring coils 4, 6 are energized via the terminals S1 and S3. For this purpose, a suitable amplifier 32 is supplied with the clock pulse of a clock generator 34. The clock generator 34 is preferably part of a processing unit 36, e.g., of a computer or a microcontroller which, in turn, may be part of the evaluation circuit 30. The signal of the coil system, which is comprised of the first and second measuring coils 4, 6 and indicates the position of the measurement object 18 within the measuring range, is tapped at the voltage tap S2. This signal is detected with the aid of a suitable input amplifier 35, e.g. an operational amplifier, and is first digitally sampled within the processing unit 36 with the aid of an A/D converter 38 and subsequently processed further. The further processing of the signal output by the A/D converter 38 is preferably performed digitally.

The signal of the additional coil 8 that is tapped at the terminal Z2 is likewise amplified with the aid of an input amplifier 35 and subsequently sampled and digitized with the aid of a further A/D converter 38 provided in the processing unit 36. Accordingly, a digital travel signal DW and a digital signal of the additional coil 8, which is to be referred to as a digital target recognition signal DTE, are available in the processing unit 36. The digital travel signal DW is processed in a position unit 40 to form a signal indicating the position of the measurement object 18. This signal can be provided by the distance measuring sensor 2 and be used for open-loop and closed-loop control within a complex system.

In addition, the digital travel signal DW and the digital target recognition signal DTE are fed into a target recognition unit 42. The signal tapped at the additional coil 8 or at the terminal Z2 is processed in the target recognition unit 42, it being possible to decide, based on the target recognition signal DTE, whether the travel signal DW available in the position unit 40 is valid or invalid.

Figure 4:
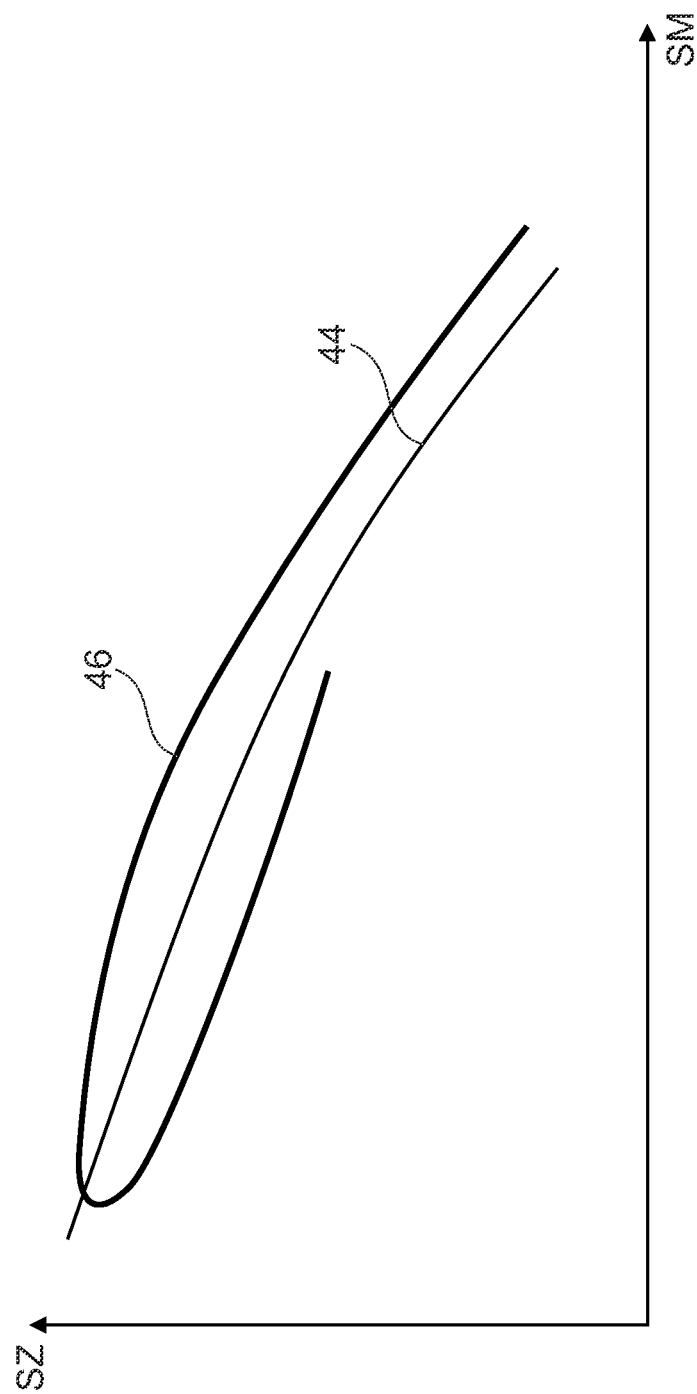
FIG. 4 shows a graph placing the quantities detected at a measuring coil in proportion to the measured quantities detected at an additional coil and illustrating a distinction or verification of the detected measured values in relation to a limit value curve.

One exemplary possibility of implementing such a decision criterion is discussed with reference to FIG. 4. FIG. 4 illustrates a signal tapped at the additional coil 8, more precisely at the terminal Z2, and a signal SZ, converted to a travel signal, of the additional coil 8 as a function of the signal SM tapped at the coil system (comprised of the first and second measuring coils 4, 6). FIG. 4 furthermore shows a limit value curve 44 plotted as a function of the measured value of the coil system SM. If the measured value of the additional coil SZ, which lies on the curve 46, is above the limit value curve 44, the measurement object 18 is situated within the valid measuring range. Depending on the wiring of the electronics and the connection of the coils, the signs of the signals may change, but the profile of the measured values shown in FIG. 4 will, in principle, always remain the same.

In the simplest case, the limit value curve 44 is determined as a first-order function, i.e. of an equation of a straight line. Advantageously, however, a function of a higher order, e.g., of a second order, may be used in order to avoid an ambiguity in the assignment between the measured values SM of the measuring coils 4, 6 and the measured values SZ of the additional coil 8. Such a limit value curve 44 of a higher order intersects the measured value curve 46, in the way as illustrated in FIG. 4, for example in the apex thereof. The point of intersection between the limit value curve 44 and the measured value curve 46 describes the limit of the valid measuring range.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A noncontact distance measuring sensor comprising:
a coil arrangement including at least two measuring coils oriented along a common axis;
an electrically and/or magnetically conducting measurement object which is in an electromagnetic interaction with the coil arrangement;
an evaluation circuit for evaluating and ascertaining a position of the measurement object, the coil arrangement including a voltage tap which is coupled to the evaluation circuit and at which a signal can be detected that indicates a position of the measurement object, and the evaluation circuit being designed to convert the signal detected at the voltage tap to an output quantity that indicates the position of the measurement object in relation to an initial position of the measurement object; and
an additional coil which is arranged on the common axis, is coupled to the evaluation circuit, and at least partly overlaps at least one of the two measuring coils to determine whether the signal detected at the voltage tap is valid or invalid.

2. The distance measuring sensor according to claim 1, wherein in relation to the initial position of the measurement object, the coil arrangement is structured symmetrically as viewed along the common axis, and that the additional coil, likewise viewed along the common axis, is arranged asymmetrically in relation to the initial position of the measurement object.

3. The distance measuring sensor according to claim 2, wherein an open end at which the measurement object can leave a measuring range of the distance measuring sensor to one side, the additional coil is arranged between the initial position of the measurement object and the open end in a direction of the common axis.

4. The distance measuring sensor according to claim 3, wherein the additional coil extends in the direction of the common axis in a region adjacent to the initial position of the measurement object.

5. The distance measuring sensor according to claim 1, wherein the measurement object is arranged in an interior enclosed by the coil arrangement, and the additional coil encloses the coil arrangement.

6. The distance measuring sensor according to claim 1, wherein the additional coil is coupled to be operated in an idle state.

7. The distance measuring sensor according to claim 1, wherein the at least two measuring coils comprise series-connected first and second measuring coils, and the voltage tap is located at least approximately at the initial position of the measurement object between the two measuring coils, and the first and second measuring coils cooperate with the measurement object as a half bridge.

8. The distance measuring sensor according to claim 7, wherein the additional coil is coupled to the voltage tap.

9. The distance measuring sensor according to any of claim 1, wherein the coil arrangement comprises first to third coils, the first and third coils acting as the first and second measuring coils, and a second coil being arranged between the first and third coils in the direction of the common axis and being coupled to the evaluation circuit so that the latter can be energized, the first and third coils being coupled in opposite directions so that the coil arrangement cooperates with the measurement object in the nature of a linear variable differential transformer, and the voltage tap being a differential voltage tap between the free ends of the coupled first and third coils.

10. The distance measuring sensor according to claim 1, wherein the evaluation circuit is designed to determine, on a basis of a signal detectable at the additional coil, whether the signal detected at the voltage tap is valid or invalid.

11. The distance measuring sensor according to claim 10, wherein the evaluation circuit is designed to calculate a limit value from the output quantity indicating the position of the measurement object in relation to the initial position thereof, and is further designed to specify whether the signal detected at the voltage tap is valid or invalid as a function of whether the signal detectable at the additional coil exceeds or falls below this limit value.

12. A method for noncontact distance measurement, comprising:
determining a position of an electrically and/or magnetically conducting measurement object in relation to a coil arrangement including at least two measuring coils oriented along a common axis by detecting at a voltage tap a measuring signal indicating a position of the measurement object in relation to an initial position of the measurement object; and
detecting a signal at an additional coil which at least partly overlaps at least one of the two measuring coils, to determine whether the signal detected at the voltage tap is valid or invalid.

13. The method according to claim 12, comprising:
first detecting the measuring signal at the voltage tap;
calculating a limit value from this measuring signal; and
determining, on a basis of a comparison between the limit value and the signal detected at the additional coil, whether the signal detected at the voltage tap is valid or invalid.

* * * * *

UNITED STATES PATENT AND TRADEMARK OFFICE
CERTIFICATE OF CORRECTION

| | | |
|---|---|---|
| PATENT NO. | : 9,052,178 B2 | Page 1 of 1 |
| APPLICATION NO. | : 13/645661 | |
| DATED | : June 9, 2015 | |
| INVENTOR(S) | : Kersten Grosse | |

It is certified that error appears in the above-identified patent and that said Letters Patent is hereby corrected as shown below:

ON THE TITLE PAGE:

Item (71) Applicants should read as:

--Buerkert Werke GmbH, Ingelfingen (DE); Micro-Epsilon Messtechnik GmbH & Co., KG, Ortenburg (DE)--

Item (73) Assignees should read as:

--Buerkert Werke GmbH, Ingelfingen (DE); Micro-Epsilon Messtechnik GmbH & Co., KG, Ortenburg (DE)--

Signed and Sealed this
Nineteenth Day of January, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,052,178 B2 | Page 1 of 1 |
| APPLICATION NO. | : 13/645661 | |
| DATED | : June 9, 2015 | |
| INVENTOR(S) | : Kersten Grosse et al. | |

It is certified that error appears in the above-identified patent and that said Letters Patent is hereby corrected as shown below:

TITLE PAGE: Item 71 & 73

Item (71) Applicants should read as:

--Buerkert Werke GmbH, Ingelfingen (DE); Micro-Epsilon Messtechnik GmbH & Co., KG, Ortenburg (DE)--

Item (73) Assignees should read as:

--Buerkert Werke GmbH, Ingelfingen (DE); Micro-Epsilon Messtechnik GmbH & Co., KG, Ortenburg (DE)--

(as corrected to read in the Certificate of Correction issued January 19, 2016) is deleted and patent is returned to its original state with the applicant & assignee name in patent to read --Burkert Werke GmbH, Ingelfingen
(DE); **Micro-Epsilon Messtechnik
GmbH & Co. KG**, Ortenburg (DE)--

Signed and Sealed this
Twenty-sixth Day of April, 2016

Michelle K. Lee
*Director of the United States Patent and Trademark Office*

UNITED STATES PATENT AND TRADEMARK OFFICE
CERTIFICATE OF CORRECTION

PATENT NO. : 9,052,178 B2  
APPLICATION NO. : 13/645661  
DATED : June 9, 2015  
INVENTOR(S) : Kersten Grosse Page 1 of 1

It is certified that error appears in the above-identified patent and that said Letters Patent is hereby corrected as shown below:

TITLE PAGE: Item (71)

Applicants should read as:

--Buerkert Werke GmbH, Ingelfingen (DE); Micro-Epsilon Messtechnik GmbH & Co., KG, Ortenburg (DE)--

Signed and Sealed this  
Sixteenth Day of August, 2016

Michelle K. Lee  
*Director of the United States Patent and Trademark Office*